(12) United States Patent
Wang et al.

(10) Patent No.: US 11,680,577 B2
(45) Date of Patent: Jun. 20, 2023

(54) SHAFT SLEEVE ASSEMBLY, BLADE MOUNTING STRUCTURE AND AIR CONDITIONER

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Chunjie Wang, Zhuhai (CN); Pan Yang, Zhuhai (CN); Jun Huang, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 323 days.

(21) Appl. No.: 16/970,568

(22) PCT Filed: Aug. 31, 2018

(86) PCT No.: PCT/CN2018/103496
§ 371 (c)(1),
(2) Date: Aug. 17, 2020

(87) PCT Pub. No.: WO2019/174198
PCT Pub. Date: Sep. 19, 2019

(65) Prior Publication Data
US 2021/0108648 A1    Apr. 15, 2021

(30) Foreign Application Priority Data
Mar. 15, 2018   (CN) .......................... 201810214624.1

(51) Int. Cl.
F04D 29/05    (2006.01)
F04D 29/054   (2006.01)
(Continued)

(52) U.S. Cl.
CPC ......... *F04D 29/054* (2013.01); *F04D 29/263* (2013.01); *F04D 29/28* (2013.01); *F04D 29/626* (2013.01); *F24F 13/00* (2013.01)

(58) Field of Classification Search
CPC ...... F04D 29/054; F04D 29/263; F04D 29/28; F24F 13/00
See application file for complete search history.

(56) References Cited

U.S. PATENT DOCUMENTS 6,227,802 B1 * 5/2001 Torgerson ............. F04D 13/021
                                                 415/199.2

FOREIGN PATENT DOCUMENTS

CN        2823621 Y      10/2006
CN      105202039 A  *   12/2015
                    (Continued)

OTHER PUBLICATIONS

International Search Report for corresponding PCT/CN2018/103496 dated Nov. 22, 2018, 2 pages.
(Continued)

*Primary Examiner* — Sabbir Hasan
(74) *Attorney, Agent, or Firm* — Armstrong Teasdale LLP

(57) ABSTRACT

Some embodiments of the present disclosure provide a shaft sleeve assembly, a blade mounting structure and an air conditioner. The shaft sleeve assembly is configured to connect a blade shaft and a motor shaft and includes: a blade shaft sleeve a first end of the blade shaft sleeve being configured to be connected with the blade shaft; and a motor shaft sleeve, a first end of the motor shaft sleeve being configured with be connected to the motor shaft and a second end of the motor shaft sleeve being connected with a second end of the blade shaft sleeve and at least one of the blade shaft sleeve and the motor shaft sleeve is an injection molded member.

19 Claims, 16 Drawing Sheets

(51) Int. Cl.
*F04D 29/26* (2006.01)
*F04D 29/28* (2006.01)
*F04D 29/62* (2006.01)
*F24F 13/00* (2006.01)

(56) References Cited

FOREIGN PATENT DOCUMENTS

| | | | |
|---|---|---|---|
| CN | 105202039 A | | 12/2015 |
| CN | 205533412 U | | 8/2016 |
| CN | 107355863 A | | 11/2017 |
| CN | 107631352 A | * | 1/2018 |
| CN | 107631352 A | | 1/2018 |
| CN | 206889323 U | | 1/2018 |
| CN | 206943252 U | | 1/2018 |
| CN | 107676397 A | | 2/2018 |
| CN | 107742943 A | | 2/2018 |
| GB | 1184493 A | | 3/1970 |
| JP | 2017116188 A | | 6/2017 |
| WO | 2005103518 A2 | | 11/2005 |

OTHER PUBLICATIONS

European Search Report for corresponding European App. No. 18909902.1, dated Apr. 16, 2021, 9 pages.

* cited by examiner

SHAFT SLEEVE ASSEMBLY, BLADE MOUNTING STRUCTURE AND AIR CONDITIONER

CROSS-REFERENCE TO RELATED APPLICATIONS

The present application is a national stage entry of International Patent Application No. PCT/CN2018/103496, filed on Aug. 31, 2018, and claims priority to Chinese Patent Application No. 201810214624.1, filed on Mar. 15, 2018, the contents of which are hereby incorporated by reference in their entirety.

TECHNICAL FIELD

The present disclosure relates to a field of air conditioners, and in particular to a shaft sleeve assembly, a blade mounting structure and an air conditioner.

BACKGROUND

As a commonly used household appliance, an air conditioner is required to have flexible assembly performance in production and operation, such that it is assembled quickly in production, and is disassembled conveniently in later operation and maintenance for repair. Core parts of the air conditioner are a blade and a motor, and a flexible connection design therebetween has a direct impact on the quickness and convenience of assembly and disassembly.

A connection design between the blade and the motor of the air conditioner known to inventors mainly uses a way in which a motor shaft is stretched into a blade shaft, and then the blade shaft and the motor shaft are fastened by a fastening screw so that the motor drives the blade to rotate. Such a design is very inconvenient for separation and disassembly of the blade and the motor, and also makes later disassembly work difficult such as an air duct member is separated from a complete machine for cleaning, the motor is separated from the complete machine for repair, etc.

SUMMARY

Some embodiments of the present disclosure provide a shaft sleeve assembly, a blade mounting structure and an air conditioner, to solve a problem of complex machining of a connection structure between a motor shaft and a blade shaft in an air conditioner known to inventors.

According to a first aspect of some embodiments of the present disclosure provide a shaft sleeve assembly is provided, which is configured to connect a blade shaft and a motor shaft, and includes: a blade shaft sleeve, a first end of the blade shaft sleeve being configured to be connected with the blade shaft; and a motor shaft sleeve, a first end of the motor shaft sleeve being configured to be connected with the motor shaft, and a second end of the motor shaft sleeve being connected with a second end of the blade shaft sleeve; and at least one of the blade shaft sleeve and the motor shaft sleeve is an injection molded member.

In some embodiments, at least a part of the blade shaft sleeve includes a tapered segment.

In some embodiments, the blade shaft sleeve includes: a first shaft segment, the first shaft segment being configured to be connected to the blade shaft; and a second shaft segment, the second shaft segment being configured to be connected to the motor shaft sleeve; and the first shaft segment and the second shaft segment are in conic transition.

In some embodiments, an outer diameter value of the first shaft segment is smaller than an outer diameter value of the second shaft segment.

In some embodiments, the blade shaft sleeve includes a plurality of internal spiral latches disposed in the second shaft segment, and a mounting groove is formed between two adjacent internal spiral latches in the plurality of internal spiral latches 14; and the motor shaft sleeve includes a plurality of external spiral clamping jaws, and each of the plurality of external spiral clamping jaw is respectively clamped in a corresponding mounting groove.

According to a second aspect of some embodiments of the present disclosure provide a blade mounting structure, which includes a blade shaft, a motor shaft and a shaft sleeve assembly; the shaft sleeve assembly is configured to connect the blade shaft and the motor shaft; and the shaft sleeve assembly is the above-mentioned shaft sleeve assembly.

In some embodiments, the blade shaft sleeve includes: a first mounting hole; and the blade shaft is detachably disposed in the first mounting hole in a penetration manner.

In some embodiments, the first mounting hole is a tapered hole or a cylindrical hole.

In some embodiments, a first predetermined space a is formed between an end surface of the blade shaft and a bottom wall of the first mounting hole, a>0.

In some embodiments, the blade mounting structure includes a first cooperative platform surface disposed on the blade shaft, a second cooperative platform surface is disposed on an inner wall of the first mounting hole, and the first cooperative platform surface towards the second cooperative platform surface; wherein a second predetermined space b is formed between a bottom end of the first cooperative platform surface and a bottom end of the second cooperative platform surface, b>0.

In some embodiments, the blade shaft and the blade shaft sleeve are integrally molded by injection.

In some embodiments, the blade mounting structure further includes: a first fastener, the first fastener being disposed on the blade shaft sleeve and the blade shaft in a penetration manner; wherein an extension direction of the first fastener is consistent with an extension direction of an axis of the blade shaft.

In some embodiments, an axis of the first fastener is coincided with an axis of the blade shaft.

In some embodiments, a third predetermined space c is formed between an end portion of the first fastener and an end portion of a motor shaft sleeve, c>0.

In some embodiments, the blade shaft sleeve is in threaded connection with the blade shaft.

In some embodiments, at least a part of the blade shaft is a threaded segment; and the blade shaft sleeve includes: a blade shaft sleeve body; and a first threaded portion, the first threaded portion being disposed in the blade shaft sleeve body, and the blade shaft being in threaded connection with the first threaded portion.

In some embodiments, the blade shaft sleeve body is molded on an outer surface of the first threaded portion by an injection process.

In some embodiments, the motor shaft sleeve is in threaded connection with the motor shaft.

In some embodiments, a screw thread is disposed on the motor shaft; and the motor shaft sleeve includes: a motor shaft sleeve body; and a second threaded portion, the second threaded portion being disposed in the motor shaft sleeve body, and the motor shaft being in threaded connection with the second threaded portion.

In some embodiments, the motor shaft sleeve body is molded on an outer surface of the second threaded portion by the injection process.

According to a third aspect of some embodiments of the present disclosure provide an air conditioner, which includes the above-mentioned blade mounting structure, a blade and a motor; the blade is connected with the motor by the blade mounting structure.

In some embodiments, the air conditioner further includes: a rubber bearing ring; the rubber bearing ring is disposed between the blade and the motor; at least the part of a blade shaft sleeve is disposed in the rubber bearing ring in a penetration manner; and the blade shaft sleeve is in clearance fit with the rubber bearing ring.

In some embodiments, the air conditioner includes a blade end cover disposed on the blade, and the blade end cover is integrally molded with a blade shaft.

In some embodiments, the blade end cover and the blade shaft are integrally molded by injection.

The shaft sleeve assembly provided by some embodiments of the present disclosure includes the blade shaft sleeve and the motor shaft sleeve; and at least one of the blade shaft sleeve and the motor shaft sleeve is the injection molded member, so that a connection structure between the blade shaft and the motor shaft is machined quickly. For specific connection between the blade shaft and the motor shaft, the first end of the blade shaft sleeve is configured to be connected with the blade shaft, the first end of the motor shaft sleeve is configured to be connected with the motor shaft, and the second end of the motor shaft sleeve is connected with the second end of the blade shaft sleeve, so that the blade shaft and the motor shaft are mounted quickly. At least one of the blade shaft sleeve and the motor shaft sleeve of the shaft sleeve assembly is the injection molded member in some embodiments of the present disclosure, so that the connection structure between the blade shaft and the motor shaft is machined quickly, and thus the problem of complex machining of the connection structure between the motor shaft and the blade shaft in an air conditioner known to inventors is solved.

BRIEF DESCRIPTION OF THE DRAWINGS

The accompanying drawings formed into a part of the present disclosure are described here to provide a further understanding of the present disclosure. The schematic embodiments and description of the present disclosure are adopted to explain the present disclosure, and do not form improper limits to the present disclosure. In the drawings.

The drawings include the following reference signs:
10. blade shaft sleeve, 11. first mounting hole, 111. second cooperative platform surface, 12. blade shaft sleeve body, 13. first threaded portion, 14. internal spiral latch, 15. internal spiral surface, 16. first shaft segment, 17. second shaft segment, 18. mounting groove, 20. motor shaft sleeve, 21. motor shaft sleeve body, 22. second threaded portion, 23. external threaded clamping claw, 24. external spiral surface, 30. blade shaft, 31. first cooperative platform surface, 40. motor shaft, 50. first fastener, 60. blade, 61. blade end cover, 70. motor, and 80. rubber bearing ring.

DETAILED DESCRIPTION OF THE EMBODIMENTS

It is to be noted that the embodiments of the present disclosure and the features of the embodiments is combined with each other if there is no conflict. The present disclosure is described below in detail with reference to the accompanying drawings and in combination with the embodiments.

It is to be noted that the following detailed description is illustrative and is intended to provide further illustration for the present disclosure. Unless otherwise specified, all technical and scientific terms used in the specification have a same meaning generally understood by those skilled in the art of the present disclosure.

It is to be noted that terms used herein only aim to describe specific implementation manners, and are not intended to limit exemplar implementations of this disclosure. As used herein, unless otherwise directed by the context, singular forms of terms are intended to include plural forms. Besides, it will be also appreciated that when terms "contain" and/or "include" are used in the description, it is indicated that features, steps, operations, devices, assemblies and/or a combination thereof exist.

Figure 1:
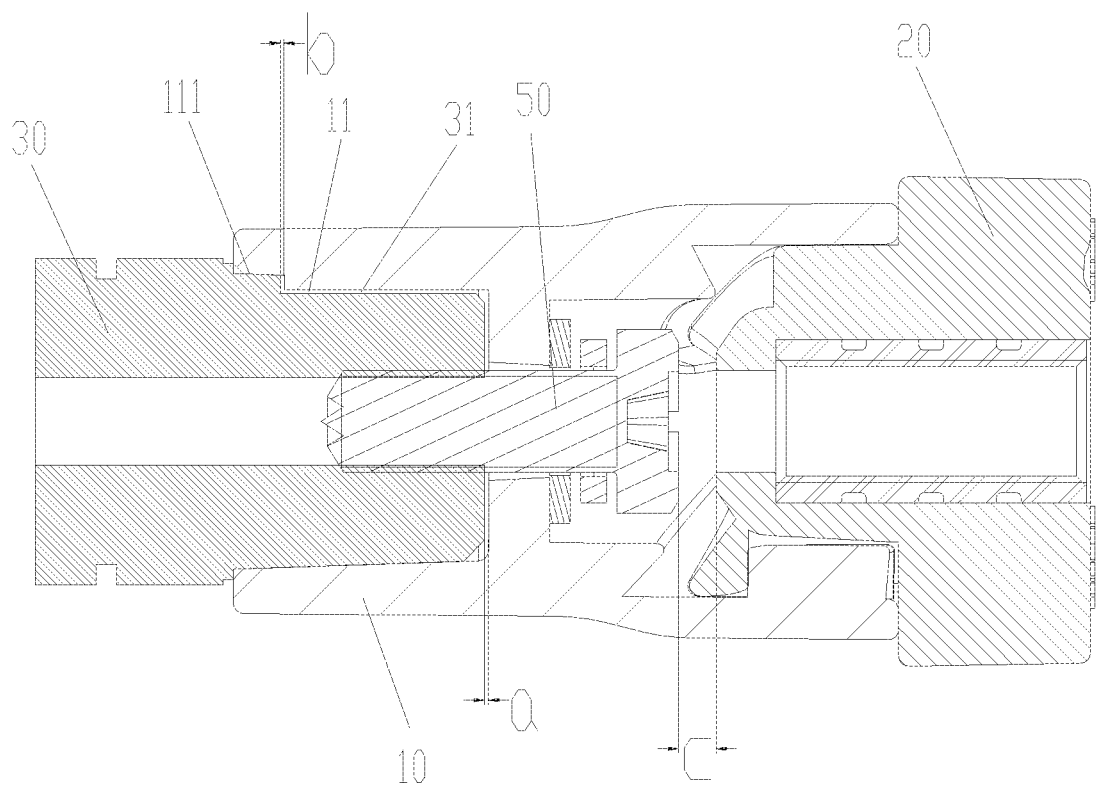
FIG. 1 illustrates a sectional schematic diagram of a shaft sleeve assembly according to some embodiments of the present disclosure.

Some embodiments of the present disclosure provide a shaft sleeve assembly. Referring to FIG. 1, the shaft sleeve assembly is configured to connect a blade shaft 30 and a motor shaft 40, and includes a blade shaft sleeve 10 and a motor shaft sleeve 20, a first end of the blade shaft sleeve 10 is configured to be connected with the blade shaft 30; a first end of the motor shaft sleeve 20 is configured to be connected with the motor shaft 40, and a second end of the motor shaft sleeve 20 is connected with a second end of the blade shaft sleeve 10; and at least one of the blade shaft sleeve 10 and the motor shaft sleeve 20 is an injection molded member.

The shaft sleeve assembly provided by some embodiments of the present disclosure includes the blade shaft sleeve 10 and the motor shaft sleeve 20; and at least one of the blade shaft sleeve 10 and the motor shaft sleeve 20 is the injection molded member, so that a connection structure between the blade shaft 30 and the motor shaft 40 is machined quickly. For specific connection between the blade shaft 30 and the motor shaft 40, the first end of the blade shaft sleeve 10 is configured to be connected with the blade shaft 30, the first end of the motor shaft sleeve 20 is configured to be connected with the motor shaft 40, and the second end of the motor shaft sleeve 20 is connected with the second end of the blade shaft sleeve 10, so that the blade shaft 30 and the motor shaft 40 are mounted quickly. At least one of the blade shaft sleeve 10 and the motor shaft sleeve 20 of the shaft sleeve assembly is the injection molded member in some embodiments of the present disclosure, so that the connection structure between the blade shaft 30 and the motor shaft 40 is machined quickly, and thus a problem of complex machining of the connection structure between the motor shaft and the blade shaft in an art known to inventors is solved.

Figure 2:
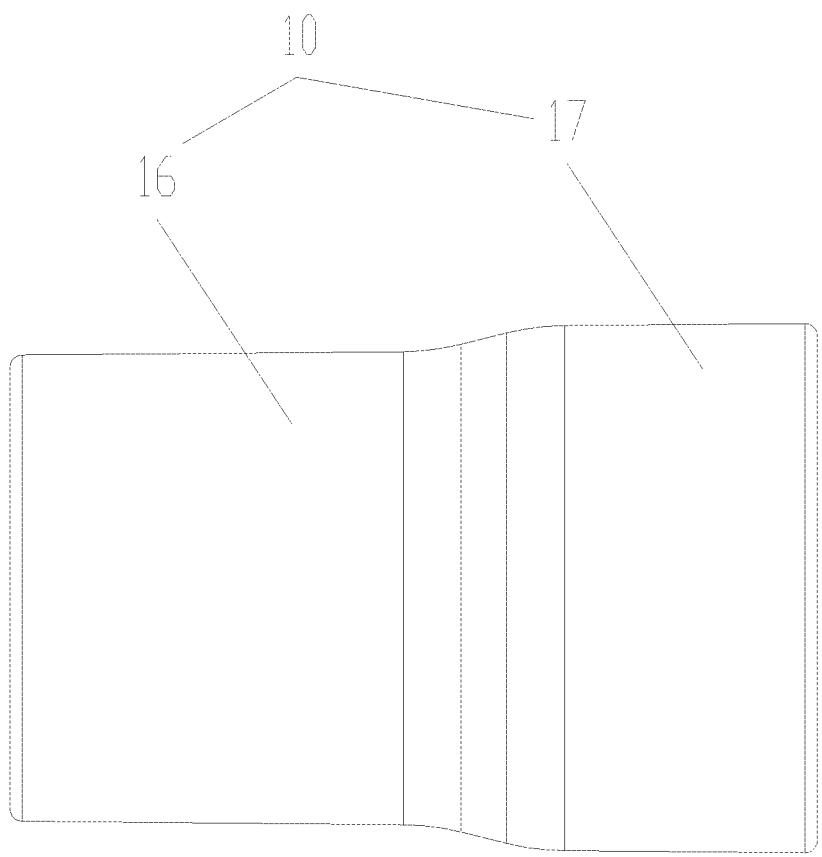
FIG. 2 illustrates a structural schematic diagram of a first viewing angle of a blade shaft sleeve of a shaft sleeve assembly according to some embodiments of the present disclosure.

In some embodiments, as shown in FIG. 2, at last a part of the blade shaft sleeve 10 includes a tapered segment.

In some embodiments of the present disclosure, at least a part of the blade shaft sleeve 10 is a cylindrical segment.

For the specific structure of the blade shaft sleeve 10, in some embodiments, as shown in FIG. 2, the blade shaft sleeve 10 includes a first shaft segment 16 and a second shaft segment 17, the first shaft segment 16 is configured to be connected with the blade shaft 30; the second shaft segment 17 is configured to be connected with the motor shaft sleeve 20; and the first shaft segment 16 and the second shaft segment 17 are in conic transition.

In some embodiments of the present disclosure, the blade shaft sleeve 10 includes the first shaft segment 16 and the second shaft segment 17, the first shaft segment 16 is configured to be connected with the blade shaft 30, the second shaft segment 17 is connected with the first shaft segment 16, and the second shaft segment 17 is configured to be connected with the motor shaft sleeve 20.

In some embodiments of the present disclosure, the first shaft segment 16 and the second shaft segment 17 are in circular arc transition.

In some embodiments of the present disclosure, the first shaft segment 16 and the second shaft segment 17 are in conic transition, i.e., the blade shaft sleeve 10 includes a conic transition segment disposed between the first shaft segment 16 and the second shaft segment 17.

In some embodiments of the present disclosure, an outer diameter value of the first shaft segment 16 is smaller than that of the second shaft segment 17.

In some embodiment of the present disclosure, considering that the first shaft segment 16 is configured to be connected with the blade shaft 30, and the blade shaft 30 has a relatively small diameter, and the second shaft segment 17 is configured to be connected with the motor shaft sleeve 20, and the motor shaft sleeve 20 has a relatively large diameter, setting the outer diameter value of the first shaft segment 16 to be smaller than that of the second shaft segment 17 is beneficial to overall mounting of the structure, and reduces the size of the structure to a certain degree.

Figure 3:
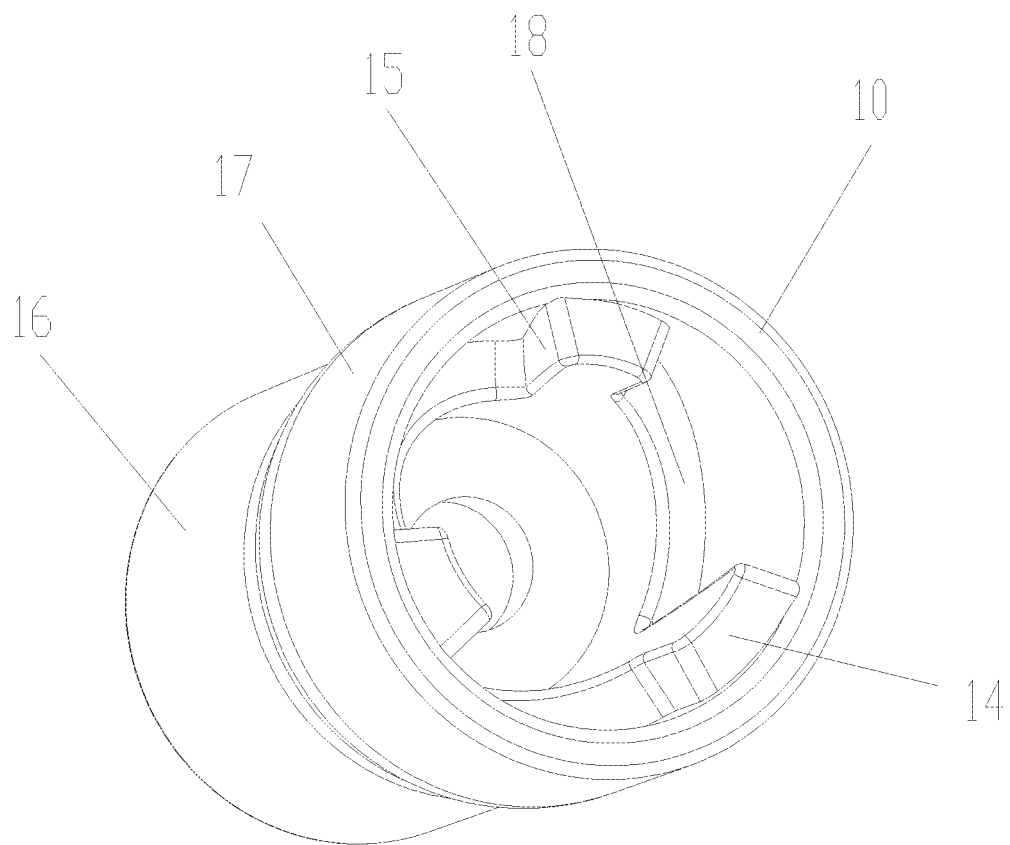
FIG. 3 illustrates a structural schematic diagram of a second viewing angle of a blade shaft sleeve of a shaft sleeve assembly according to some embodiments of the present disclosure.
Figure 4:
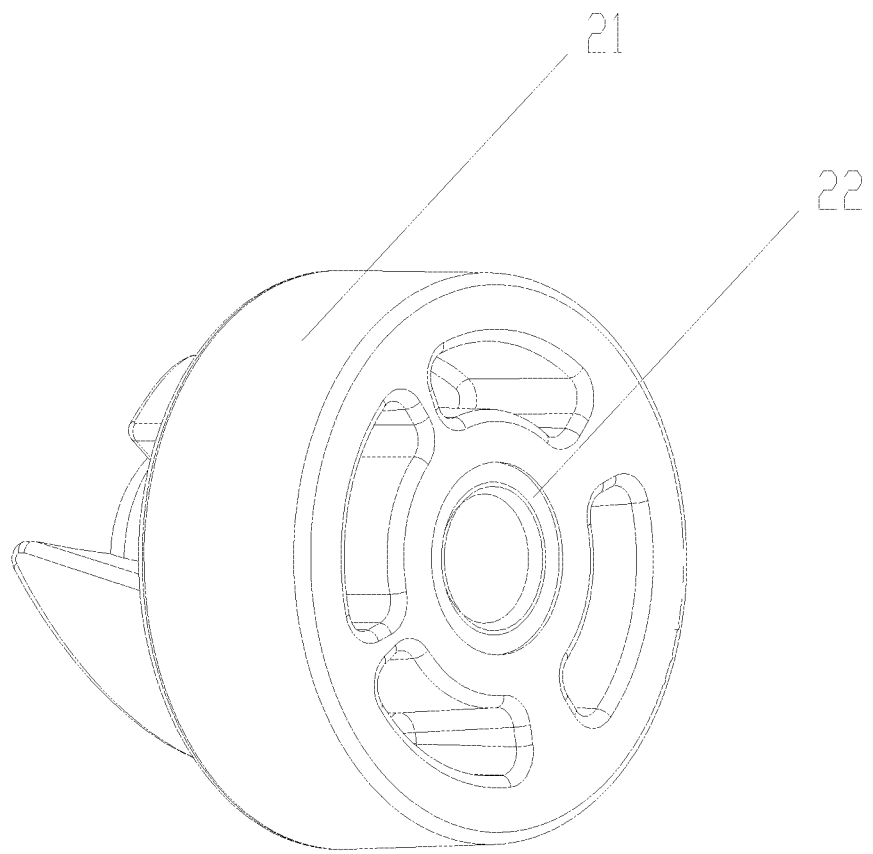
FIG. 4 illustrates a structural schematic diagram of a first viewing angle of a motor shaft sleeve of a shaft sleeve assembly according to some embodiments of the present disclosure.

In order to guarantee that the motor shaft sleeve 20 is stably connected with the blade shaft sleeve 10, as shown in FIG. 3, the blade shaft sleeve 10 includes a plurality of internal spiral latches 14 disposed in the second shaft segment 17, and a mounting groove 18 is formed between two adjacent internal spiral latches 14 in the plurality of internal spiral latches 14; and the motor shaft sleeve 20 includes a plurality of external spiral clamping jaws 23, and each of the plurality of external spiral clamping jaw 23 is respectively clamped in a corresponding mounting groove 18.

Figure 5:
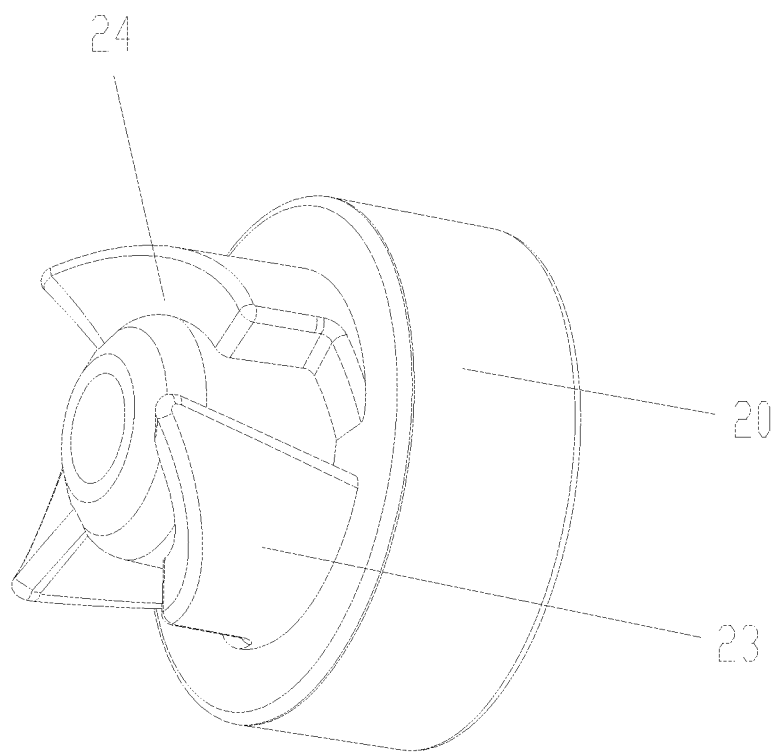
FIG. 5 illustrates a structural schematic diagram of a second viewing angle of a motor shaft sleeve of a shaft sleeve assembly according to some embodiments of the present disclosure.

As shown in FIG. 3 and FIG. 5, the blade shaft sleeve 10 includes a plurality of the internal spiral latch 14 disposed in the blade shaft sleeve 10, the plurality of internal spiral latches 14 are arranged at intervals; the mounting groove 18 is formed between two adjacent internal spiral latches 14 in the plurality of internal spiral latches 14; and the blade shaft sleeve 10 includes an internal spiral surface 15 provided on a sidewall of the mounting groove 18. Correspondingly, the motor shaft sleeve 20 includes a plurality of the external spiral clamping jaw 23, the plurality of external spiral clamping jaw 23 are arranged at intervals; each of the plurality of external spiral clamping jaw 23 is respectively clamped in the corresponding mounting groove 18; and the motor shaft sleeve 20 includes an external spiral surface 24 provided on a top end of the each external spiral clamping jaw 23.

In some embodiments of the present disclosure, the blade shaft sleeve 10 includes three internal spiral latches 14, a cooperative surface of each internal spiral latch 14 is a spiral surface, and such a spiral surface is cooperated with a spiral surface of the external spiral clamping jaw 23 of the motor shaft sleeve 20, so that tight cooperation in connection is guaranteed to form self-locking connection. Such a design prevents a problem that the blade and the motor are separated automatically due to a small axial force generated by the blade when the blade stops to rotate; and moreover, when stressed by a large separation force in an axial direction (the axial separation force applied artificially in disassembly; such a large separation force is merely relative to an auto-separation force generated in a rotation stopping process of the blade; and for a disassembly operator, such a force is within an acceptable range generally), a spiral claw type cooperation structure is separated conveniently.

In some embodiments of the present disclosure, considering that the internal spiral latch 14 is disposed in the second shaft segment 17, setting the outer diameter value of the second shaft segment 17 to be greater than that of the first shaft segment 16 guarantees the stability of the structure.

For specific materials of the blade shaft sleeve 10 and the motor shaft sleeve 20, at least one of the blade shaft sleeve 10 and the motor shaft sleeve 20 is a plastic injection molded member or a rubber injection molded member.

In some embodiments of the present disclosure, at least one of the blade shaft sleeve 10 and the motor shaft sleeve 20 is the plastic injection molded member.

In some embodiments of the present disclosure, at least one of the blade shaft sleeve 10 and the motor shaft sleeve 20 is the rubber injection molded member.

For a injection molded design of the blade shaft sleeve 10 and the motor shaft sleeve 20, an injection molding material is: a special plastic such as Polyphthalamide (PPA), and a modified Polyoxymethylene (POM), but is not specifically limited to some material, and can be other injection molding materials capable of implementing replacement of the plastic for the steel in some embodiments of the present disclosure.

In some embodiments of the present disclosure, the second end of the motor shaft sleeve 20 is detachably connected with the second end of the blade shaft sleeve 10.

In some embodiments of the present disclosure, at least a part of the motor shaft sleeve 20 is in clearance fit with at least a part of the blade shaft sleeve 10.

Some embodiments of the present disclosure further provide a blade mounting structure. Referring to FIG. 1 to FIG. 16, the blade mounting structure includes a blade shaft 30, a motor shaft 40 and a shaft sleeve assembly; the shaft sleeve assembly is configured to connect the blade shaft 30 and the motor shaft 40; and the shaft sleeve assembly is the above-mentioned shaft sleeve assembly.

In order that the blade shaft 30 is connected with a blade shaft sleeve 10, as shown in FIG. 1, the blade shaft sleeve 10 includes: a first mounting hole 11; and the blade shaft 30 is detachably disposed in the first mounting hole 11 in a penetration manner.

In the embodiment, by forming the first mounting hole 11 on the blade shaft sleeve 10, the blade shaft 30 is detachably disposed in the first mounting hole 11 in a penetration manner.

In some embodiments of the present disclosure, the first mounting hole 11 is a tapered hole or a cylindrical hole.

In view of convenience of mounting, the blade shaft sleeve 10 is a tapered segment, and the first mounting hole 11 is the tapered hole.

A peripheral surface of the blade shaft 30 and a cooperative surface of the first mounting hole 11 of the blade shaft sleeve 10 are in tapered surface fit, and a peripheral surface of the motor shaft sleeve 20 and a cooperative surface of a right axial hole of the blade shaft sleeve 10 are in tapered surface fit, and an outer diameter of an axial end portion of such a design is smaller than a diameter of an end portion of an axial hole of the shaft sleeve, so during assembly, a large hole is fitted with a small shaft, thus being very convenient to assemble; and moreover, a tapered surface takes a centering correction effect in assembly, so that a final assembly body shows a better coaxiality, and the shaft runout caused by axis deviation in later operation is prevented from affecting operation and service life of the complete machine.

In some embodiments of the present disclosure, a first predetermined space a is formed between an end surface of the blade shaft 30 and a bottom wall of the first mounting hole 11, a>0.

In some embodiments of the present disclosure, the first predetermined space a between the end surface of the blade shaft 30 and the bottom wall of the first mounting hole 11 is greater than 0, so it is ensured that while the blade shaft 30 is disposed in the first mounting hole 11 in the penetration manner, the blade shaft 30 is also prevented from contacting with the bottom wall of the first mounting hole 11 to cause unnecessary wear.

Figure 11:
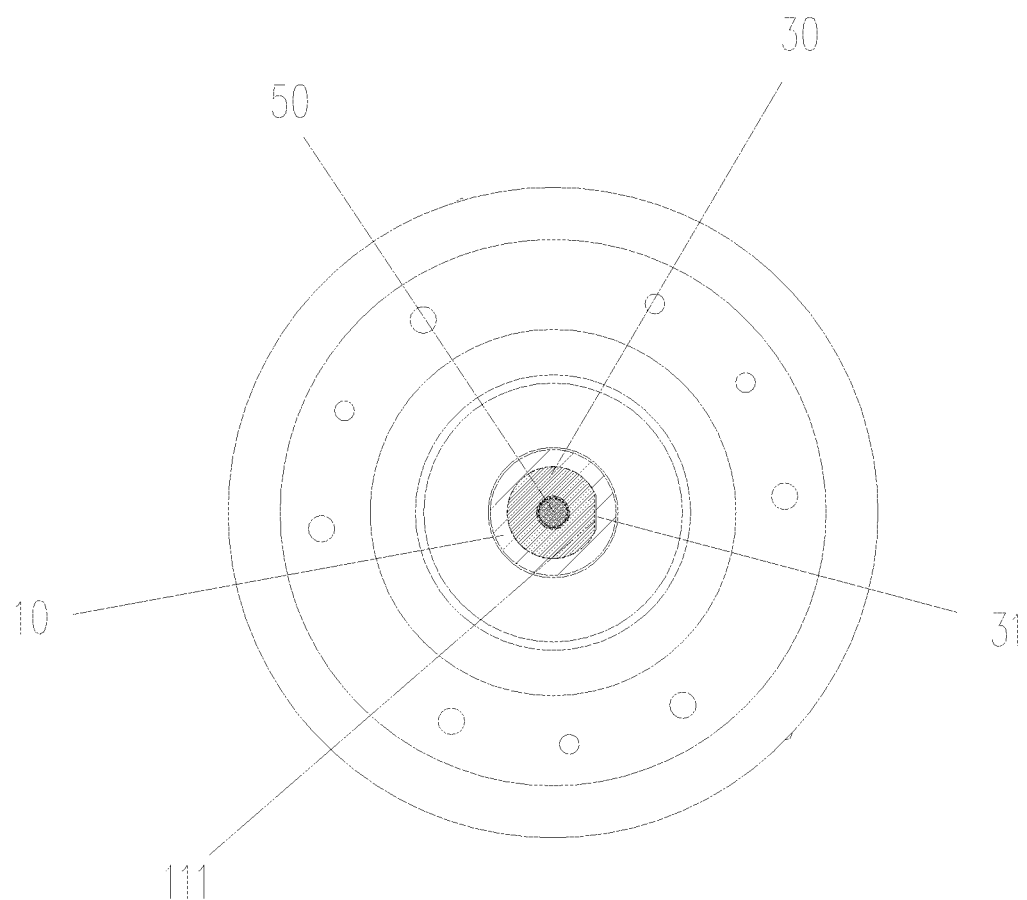
FIG. 11 illustrates a sectional structural schematic diagram in an A-A direction of a blade mounting structure in FIG. 10.

In order to guarantee the stability in cooperation, as shown in FIG. 1 and FIG. 11, the blade shaft includes a first cooperative platform surface 31, the first mounting hole includes a second cooperative platform surface 111 disposed on an inner wall of the first mounting hole 11, and the first cooperative platform surface 31 towards the second cooperative platform surface 111; wherein a second predetermined space b is formed between a bottom end of the first cooperative platform surface 31 and a bottom end of the second cooperative platform surface 111, b>0.

In some embodiments of the present disclosure, the first cooperative platform surface 31 towards the second cooperative platform surface 111, i.e., the first cooperative platform surface 31 and the second cooperative platform surface 111 are opposite to each other, and the first cooperative platform surface 31 and the second cooperative platform surface 111 are perpendicular to a same straight line.

In some embodiments of the present disclosure, the bottom end of the first cooperative platform surface 31 is an end of the first cooperative platform surface 31 away from the motor shaft sleeve 20, and the bottom end of the second cooperative platform surface 111 is an end of the second cooperative platform surface 111 close to the motor shaft sleeve 20.

In some embodiments of the present disclosure, the second predetermined space b is formed between the bottom end of the first cooperative platform surface 31 and the bottom end of the second cooperative platform surface 111; and by setting b>0, it is ensured that while the blade shaft 30 is assembled in place, limited contact between the blade shaft 30 and the blade shaft sleeve 10 is prevented.

In some embodiments, a first predetermined space a is formed between an end surface of the blade shaft 30 and a bottom wall of the first mounting hole 11, b>a>0.

In the embodiment, by setting b>a>0, it is ensured that while the blade shaft 30 is stably connected to the blade shaft sleeve 10, the blade shaft 30 is prevented from clamping the blade shaft sleeve 10.

In some embodiments of the present disclosure, the blade shaft 30 and the blade shaft sleeve 10 are integrally molded by injection.

In some embodiments of the present disclosure, by integrally molding the blade shaft 30 and the blade shaft sleeve 10 by injection, the mounting efficiency is improved, and the quick connection of the overall structure is benefited.

Figure 6:
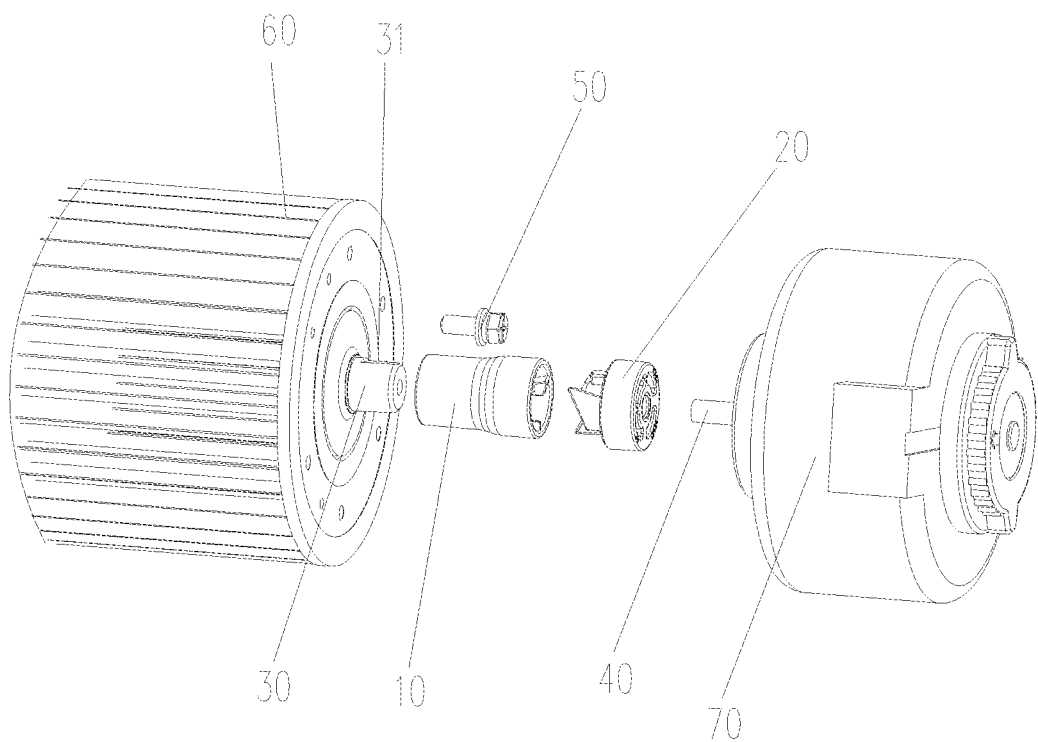
FIG. 6 illustrates an overall exploded structural schematic diagram of a blade mounting structure according to some embodiments of the present disclosure.
Figure 7:
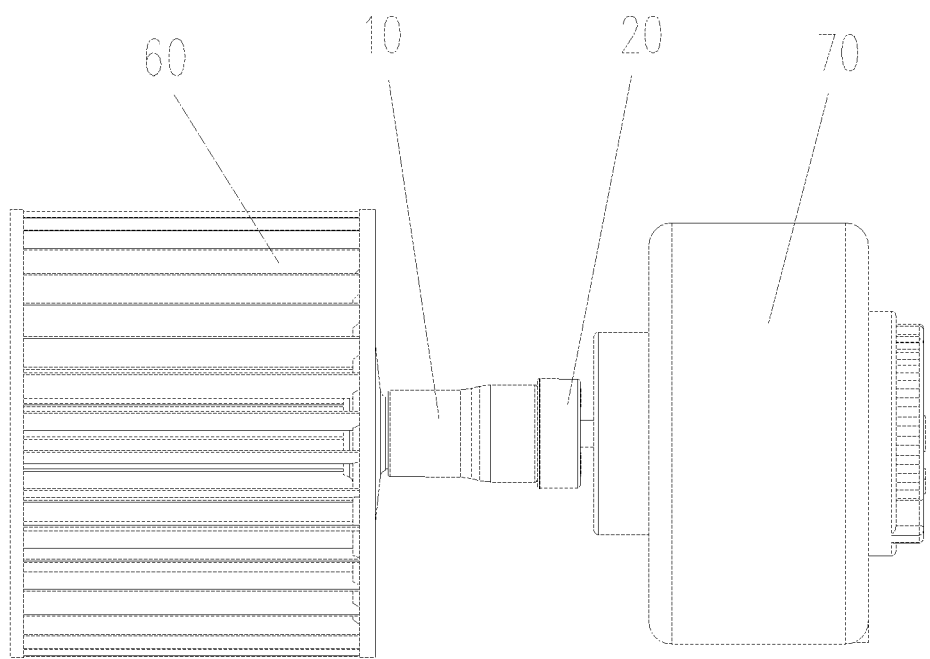
FIG. 7 illustrates an assembly structural schematic diagram of a blade mounting structure according to some embodiments of the present disclosure.
Figure 8:
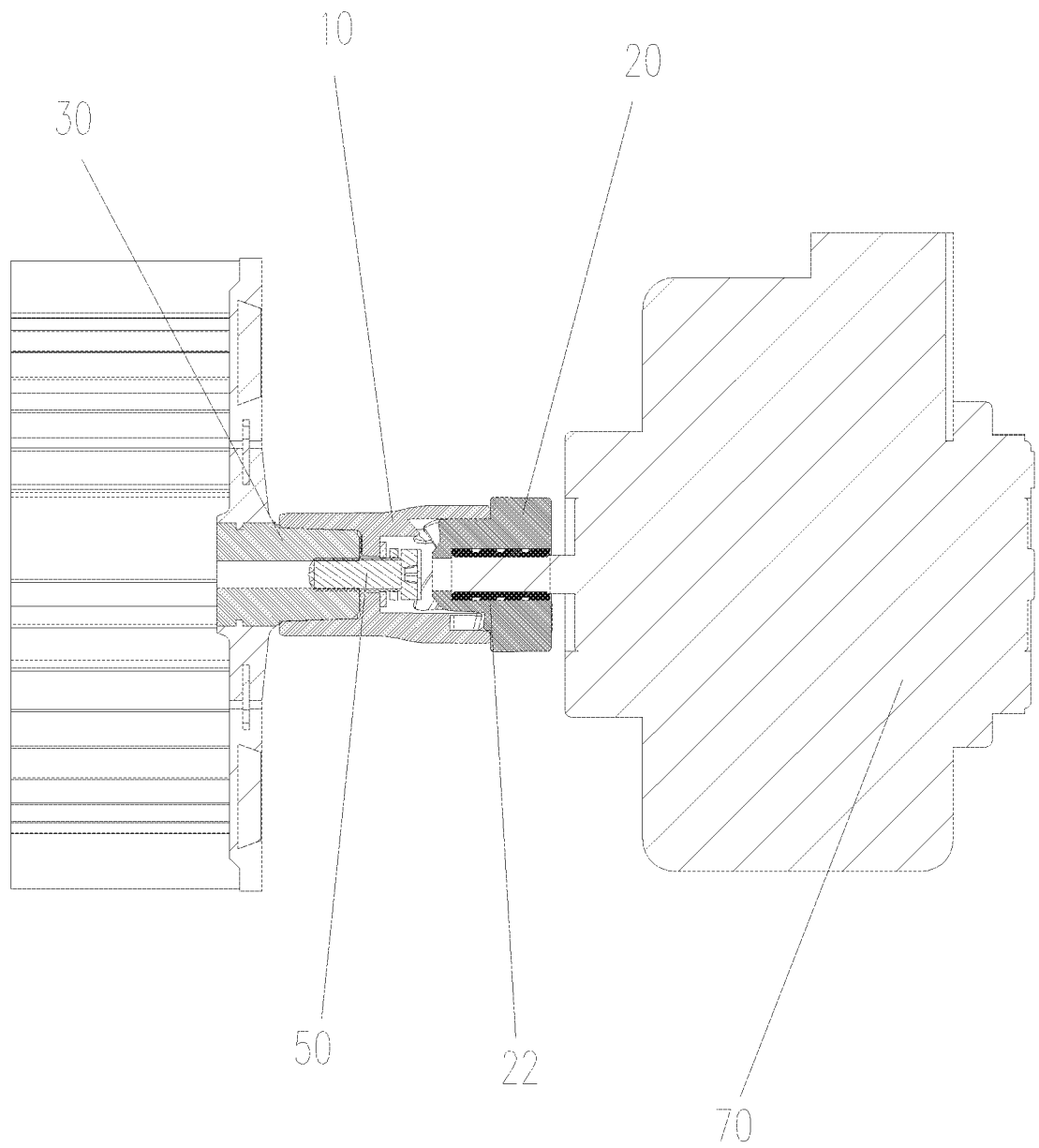
FIG. 8 illustrates a sectional structural schematic diagram of a blade mounting structure in FIG. 7.
Figure 9:
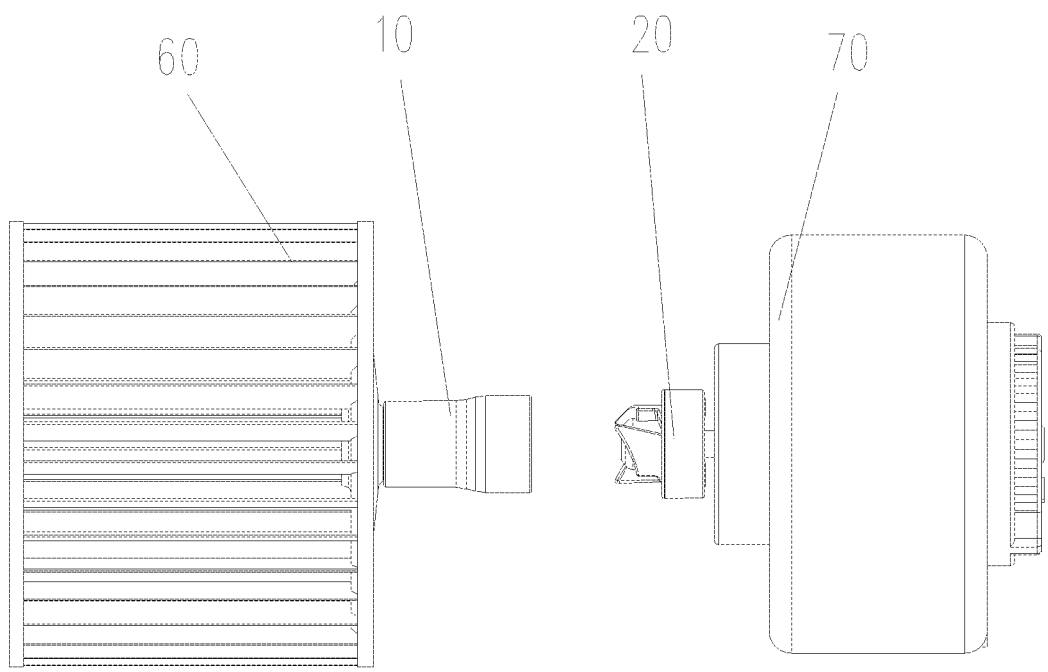
FIG. 9 illustrates a partial breakdown structural schematic diagram of a blade mounting structure according to some embodiments of the present disclosure.
Figure 10:
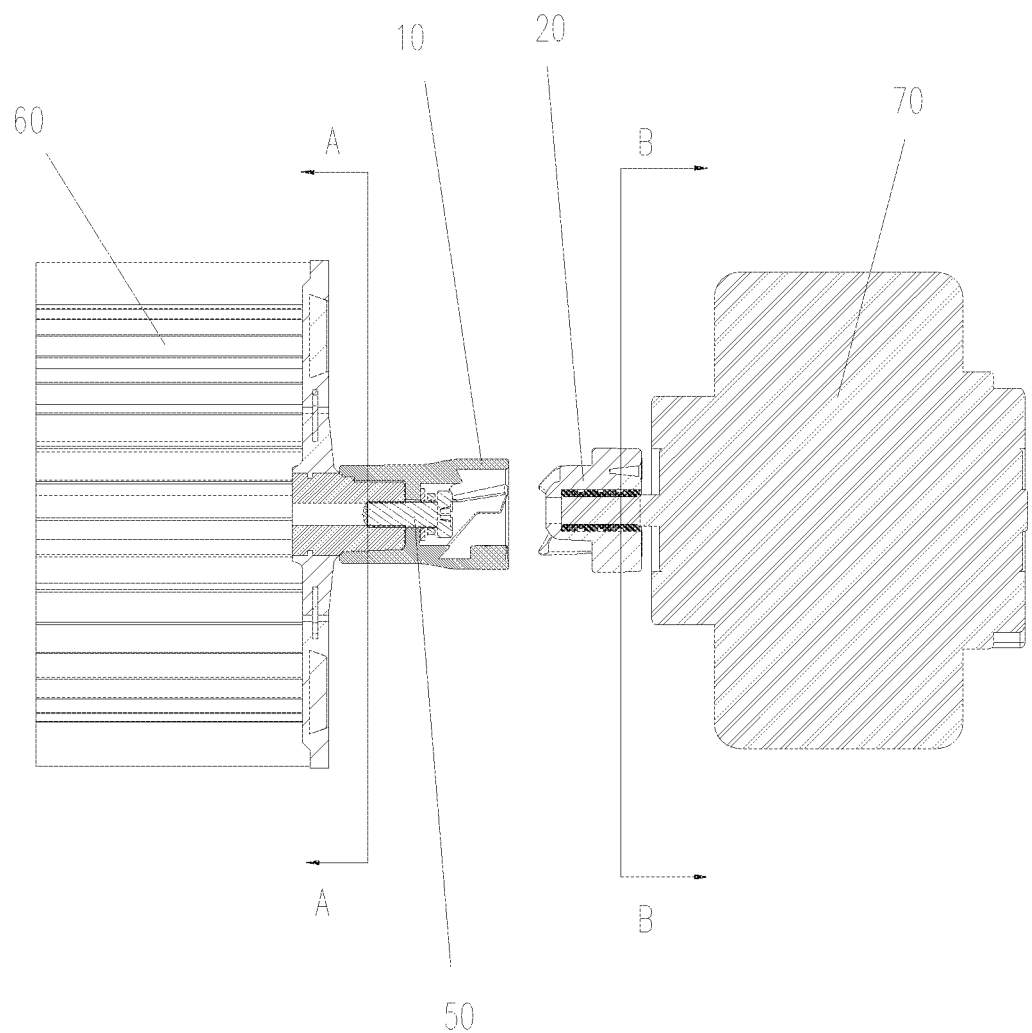
FIG. 10 illustrates a sectional structural schematic diagram of a blade mounting structure in FIG. 9.

In order to guarantee that the blade shaft sleeve 10 is stably connected with the blade shaft 30, as shown in FIG. 6 and FIG. 7, the blade mounting structure further includes a first fastener 50, the first fastener 50 is disposed on the blade shaft sleeve 10 and the blade shaft 30 in a penetration manner; and an extension direction of the first fastener 50 is consistent with that of an axis of the blade shaft 30.

In some embodiments of the present disclosure, as the first fastener 50 is disposed on the blade mounting structure, and the first fastener 50 is disposed on the blade shaft sleeve 10 and the blade shaft 30 in the penetration manner, the stable connection between the blade shaft sleeve 10 and the blade shaft 30 is implemented by the first fastener 50.

In some embodiments of the present disclosure, as the extension direction of the first fastener 50 is consistent with that of the axis of the blade shaft 30, the first fastener 50 implements the stable connection between the blade shaft sleeve 10 and the blade shaft 30 by an axial position.

In some embodiments of the present disclosure, an axis of the first fastener 50 is coincided with that of the blade shaft 30.

In some embodiments of the present disclosure, a third predetermined space c is formed between an end portion of the first fastener 50 and an end portion of the motor shaft sleeve 20, c>0.

In some embodiments of the present disclosure, the first fastener 50 is a bolt.

In some embodiments of the present disclosure, the first fastener 50 is in threaded connection with the blade shaft sleeve 10.

In the embodiment, a clearance between a left end surface of the blade shaft sleeve 10 and a cooperative end surface of the blade shaft 30, and a clearance between a right end surface of the blade shaft sleeve 10 and a cooperative end surface of the motor shaft sleeve 20 are zero, and a fit clearance between a front end surface of the blade shaft 30 and an inner end surface of a left axial hole of the blade shaft sleeve 10 is smaller than a clearance value between an end surface of a shaft cooperative platform and an end surface of a cooperative platform of an axial hole of the blade shaft sleeve; and meanwhile, a top of a connection bolt of a shaft center of the blade shaft sleeve and an end portion of the motor shaft sleeve, and a spiral clamping claw of the motor shaft sleeve and a right spiral surface of the blade shaft sleeve are in clearance fit. With design on a relationship of the size of the fit clearance, it is ensured that the blade shaft is assembled in place; as a shaft end is not propped against the shaft sleeve, the spiral clamping claw of the motor shaft sleeve assembly is integrally assembled in the blade shaft sleeve to axially drive the blade to rotate; and the clearance fit of the shaft center effectively eliminates axial vibration in operation that is transferred by the shaft center.

For another connection manner between the blade shaft sleeve 10 and the blade shaft 30, the blade shaft sleeve 10 is in threaded connection with the blade shaft 30.

Figure 14:
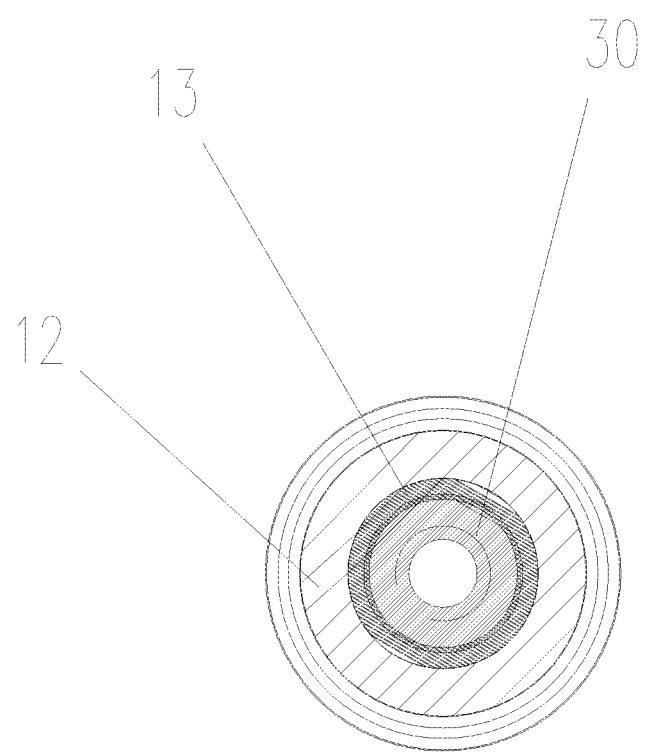
FIG. 14 illustrates a sectional structural schematic diagram in a C-C direction in FIG. 13.
Figure 15:
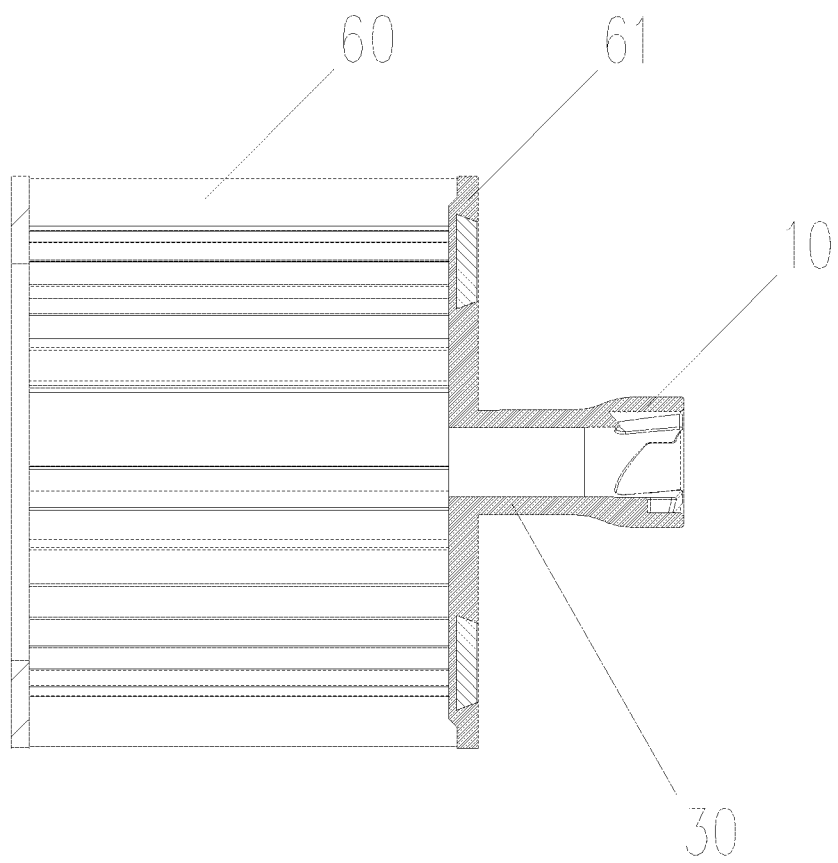
FIG. 15 illustrates a mounting structural schematic diagram of a blade and a blade shaft according to some embodiments of the present disclosure.

For a specific structure of the blade shaft sleeve 10, as shown in FIG. 14, at least a part of the blade shaft 30 is a threaded segment; and the blade shaft sleeve 10 includes a blade shaft sleeve body 12 and a first threaded portion 13, the first threaded portion 13 is disposed in the blade shaft sleeve body 12, and the blade shaft 30 is in threaded connection with the first threaded portion 13.

In some embodiments of the present disclosure, the blade shaft sleeve 10 includes the blade shaft sleeve body 12 and the first threaded portion 13, the first threaded portion 13 is disposed in the blade shaft sleeve body 12, and the blade shaft 30 is in threaded connection with the first threaded portion 13.

To improve the machining efficiency, the blade shaft sleeve body 12 is molded on an outer surface of the first threaded portion 13 by an injection process.

In some embodiments of the present disclosure, an embedding nut (the first threaded portion 13) is coaxial with a shaft sleeve injection molding body (the blade shaft sleeve body 12) when the embedding nut is in an injection molding body, and a control precision on a coaxiality in precise injection molding production is relatively high; and meantime, after the embedding nut is tightly connected to a screw thread, a coaxiality between the blade shaft and an external shaft sleeve is guaranteed, thus obtaining a coaxiality between connected shaft and a shaft sleeve of the blade assembly.

In some embodiments, the motor shaft sleeve 20 is in threaded connection with the motor shaft 40.

Figure 12:
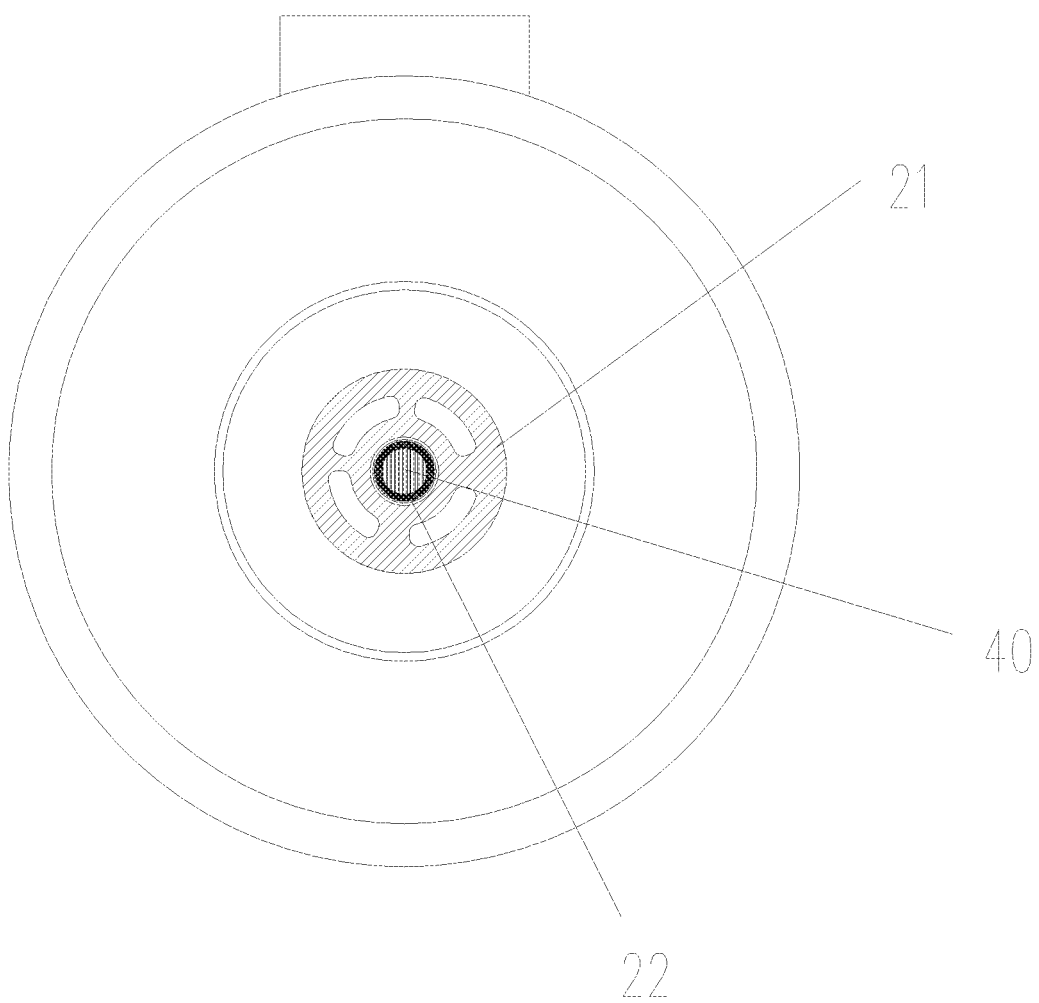
FIG. 12 illustrates a sectional structural schematic diagram in a B-B direction of a blade mounting structure in FIG. 10.
Figure 13:
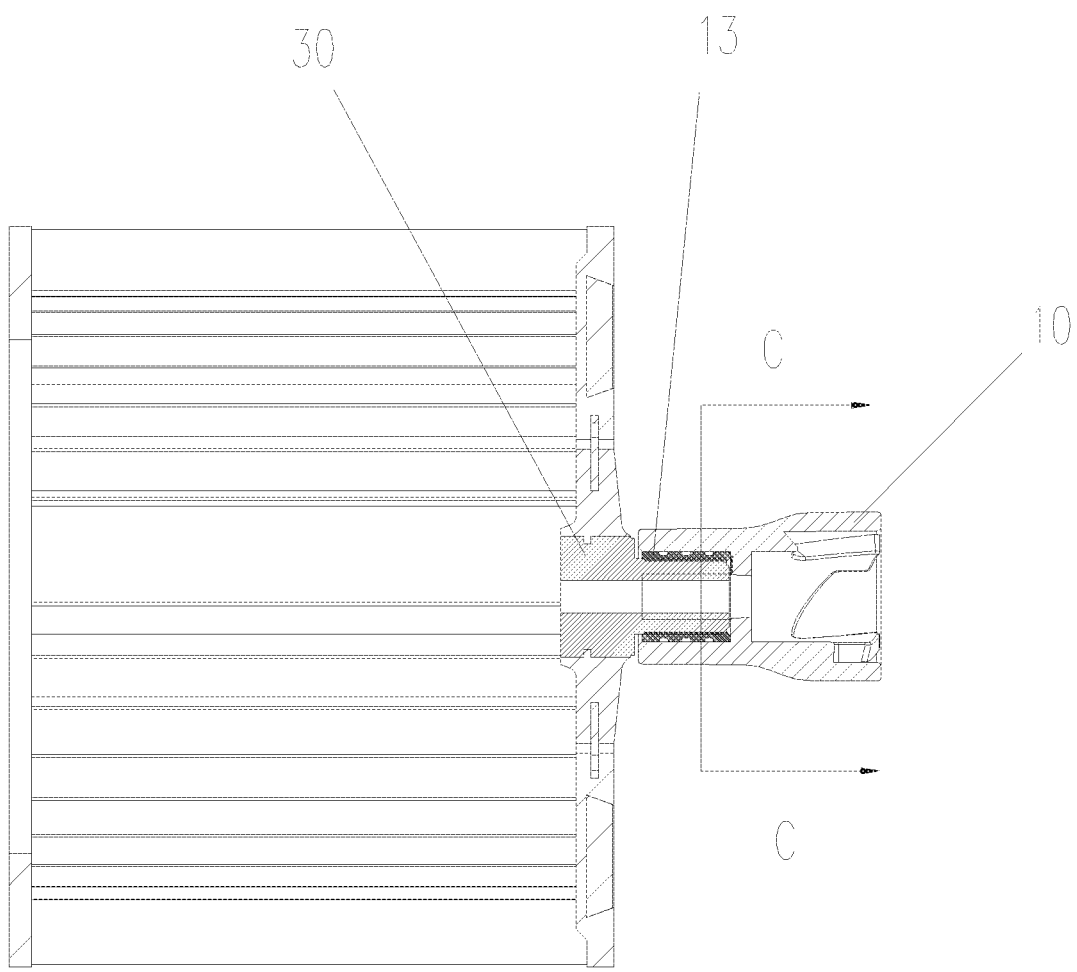
FIG. 13 illustrates a mounting structural schematic diagram of a blade shaft sleeve and a blade shaft according to some embodiments of the present disclosure.

For a specific structure of the motor shaft sleeve 20, as shown in FIG. 12, a screw thread is disposed on the motor shaft; and the motor shaft sleeve 20 includes a motor shaft sleeve body 21 and a second threaded portion 22, the second threaded portion 22 is disposed in the motor shaft sleeve body 21, and the motor shaft 40 is in threaded connection with the second threaded portion 22.

In some embodiments of the present disclosure, the motor shaft sleeve 20 includes the motor shaft sleeve body 21 and the second threaded portion 22, the second threaded portion 22 is disposed in the motor shaft sleeve body 21, and the motor shaft 40 is in threaded connection with the second threaded portion 22.

In some embodiments, the motor shaft sleeve body 21 is molded on an outer surface of the second threaded portion 22 by the injection process.

Figure 16:
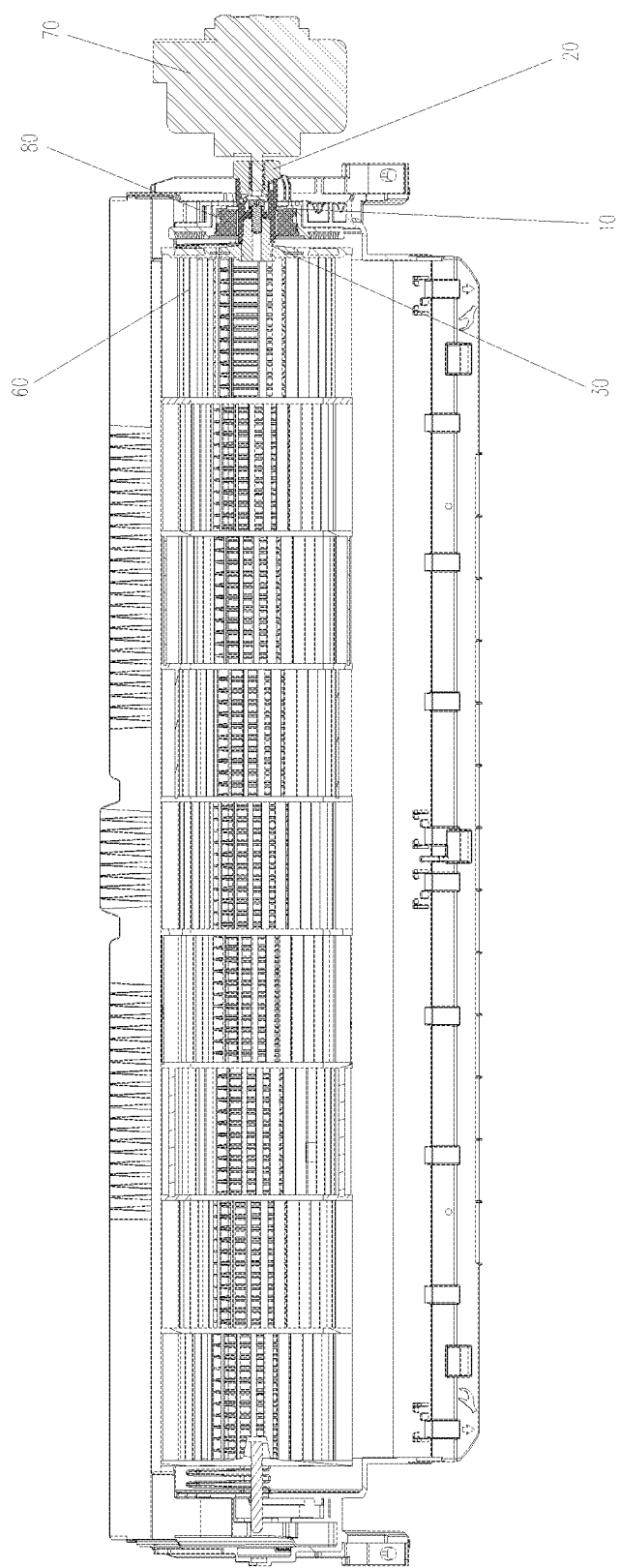
FIG. 16 illustrates a partial structural schematic diagram of an air conditioner according to some embodiments of the present disclosure.
Figure 17:
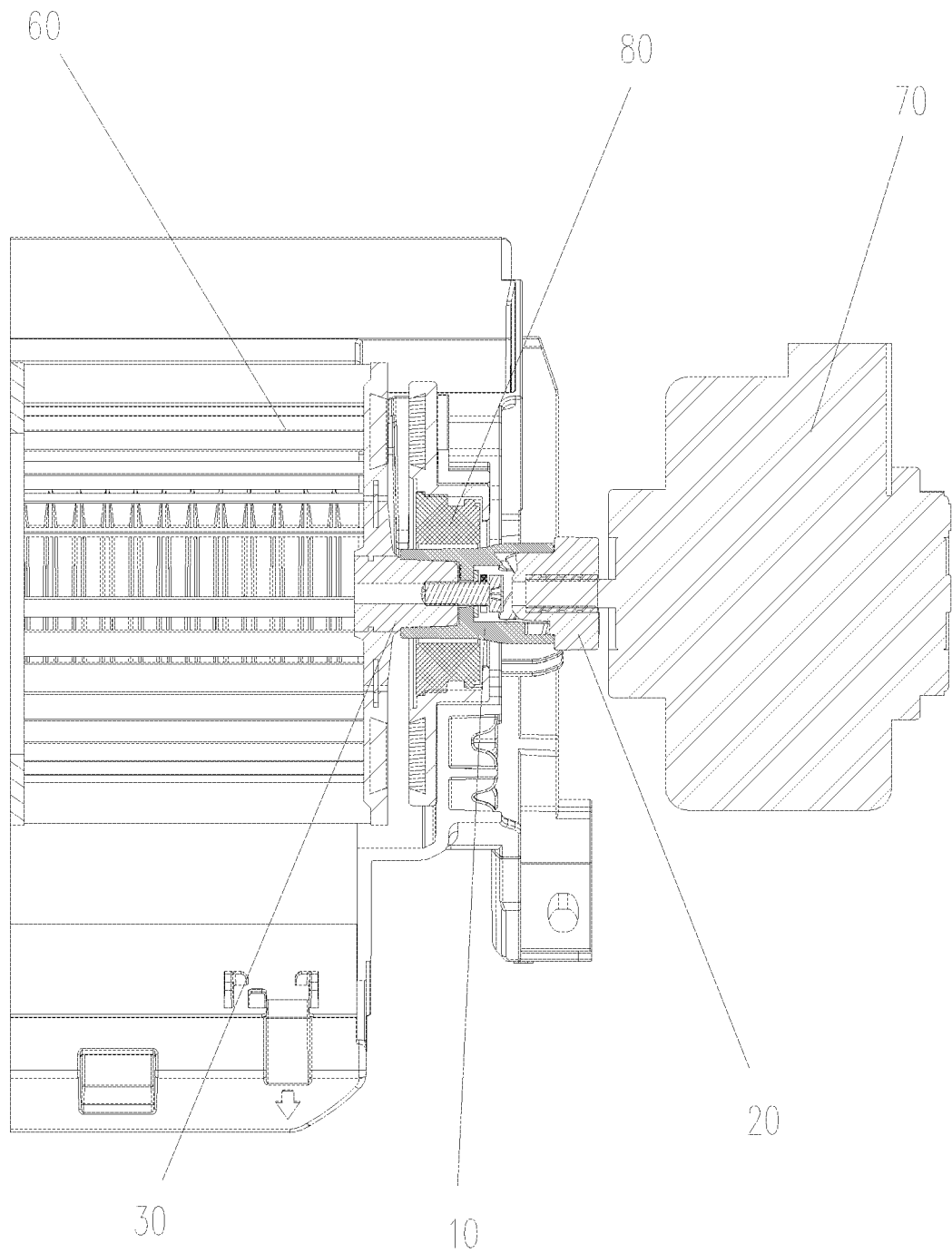
FIG. 17 illustrates a partially enlarged structural schematic diagram of an air conditioner in FIG. 16.

The present disclosure further provides an air conditioner. As shown in FIG. 16 and FIG. 17, the air conditioner includes the above-mentioned blade mounting structure, a blade 60 and a motor 70; the blade 60 is connected with the motor 70 by the blade mounting structure.

In some embodiments of the present disclosure, as shown in FIG. 16 and FIG. 17, the air conditioner further includes a rubber bearing ring 80, the rubber bearing ring 80 is disposed between the blade 60 and the motor 70; at least a part of the blade shaft sleeve 10 is disposed in the rubber bearing ring 80 in a penetration manner; and the blade shaft sleeve 10 is in clearance fit with the rubber bearing ring 80.

During assembly of the complete machine, when a whole blade assembly moves leftwards in disassembly operation, a tapered surface on the outer surface of the blade shaft sleeve enables the blade shaft to gradually reduce the fit clearance between the shaft sleeve and the rubber bearing ring 80 in a separation process, and at last, an external tapered surface of the blade shaft sleeve is in slight interference fit with an internal hole surface of the rubber bearing ring. In this way, during the separation process, the peripheral shrinkage also guarantees a coaxiality of the whole assembly body, and a coaxiality after a assembly body is assembled completely in a later period is not affected in disassembly.

After the blade assembly and the motor assembly are connected and assembled in place, the outer surface of the blade shaft sleeve and the rubber bearing ring are in clearance fit, and such a design directly prevents mechanical friction between the blade shaft sleeve and the rubber bearing ring in operation; even in case of slight shaft runout in the operation, the shaft sleeve is also not worn and collided, and the mechanical contact due to various external factors is prevented. Therefore, a reliability of a complete machine in the operation is guaranteed, a service life of the complete machine is prolonged, noise generated by the mechanical friction is further prevented, and a quality of noise in the operation is greatly improved.

In some embodiments of the present disclosure, the air conditioner includes a blade end cover 61 disposed on the blade 60, and the blade end cover 61 is integrally molded with a blade shaft 30.

In some embodiments of the present disclosure, the blade end cover 61 and the blade shaft 30 are integrally molded by injection.

In some embodiments of the present disclosure, the blade shaft 30 and the blade shaft sleeve 10 are integrally molded by injection.

The blade end cover 61 and the blade shaft 30 are integrally molded by injection, so that an assembly of a connection shaft in pre-assembly of the blade assembly is directly omitted, an assembly operation is greatly simplified, and a production efficiency is further improved. Because of such an integral design of the blade, an incoming material in production of an assembly branch directly is the integral blade assembly that is assembled directly. Additionally, as a control precision on a coaxiality in a precise injection molding production is relatively high, and an assembly of a subsequent blade shaft and the blade shaft sleeve is not related, a coaxiality influencing factor is further eliminated, and the complete machine obtains a better assembly characteristic in assembly.

For a injection molded design of the blade shaft sleeve (or a portion where a blade connection shaft is integrally molded with the blade end cover) and the motor shaft sleeve. In some embodiments of the present disclosure, an injection molding material is: a special plastic such as PPA, and a modified POM, but is not specifically limited to some material, and in some embodiments of the present disclosure, an injection molding material is other injection molding materials capable of implementing replacement of the plastic for the steel.

As can be seen from the above description, the above embodiments of the present disclosure implement the following technical effects:

The shaft sleeve assembly provided by the present disclosure includes the blade shaft sleeve 10 and the motor shaft sleeve 20; and at least one of the blade shaft sleeve 10 and the motor shaft sleeve 20 is the injection molded member, so that the connection structure between the blade shaft 30 and the motor shaft 40 is machined quickly. For specific connection between the blade shaft 30 and the motor shaft 40, the first end of the blade shaft sleeve 10 is configured to be connected with the blade shaft 30, the first end of the motor shaft sleeve 20 is configured to be connected with the motor shaft 40, and the second end of the motor shaft sleeve 20 is connected with the second end of the blade shaft sleeve 10, so that the blade shaft 30 and the motor shaft 40 are mounted quickly. At least one of the blade shaft sleeve 10 and the motor shaft sleeve 20 of the shaft sleeve assembly is the injection molded member in some embodiments of the present disclosure, so that the connection structure between the blade shaft 30 and the motor shaft 40 is machined quickly, and thus the problem of complex machining of the connection structure between the motor shaft and the blade shaft in an air conditioner known to inventors is solved.

It should be noted that, terminologies such as "first" and "second" in the specification, claims and accompanying drawings of the present disclosure are only used to distinguish similar objects, rather than to describe a special order or a precedence order. It should be understood that data used in such a way may be interchangeable in a certain cases, such that the embodiments of the present disclosure described here can be implemented in an order other than those illustrated or described here. In addition, the terms "comprise," "comprising," "include," "including," "has," "having" or any other variation thereof, are intended to cover a non-exclusive inclusion. For example, a process, method, system, product or device that includes a list of steps or units is not necessarily limited to only those steps or units but may include other steps or units not expressly listed or inherent to such process, method, product or device.

For ease of description, spatial relative terms such as "over", "above", "on an upper surface" and "upper" are used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" includes two orientations namely "above" and "below". The device may also be located in other different modes (rotated by 90 degrees or located in other orientations), and spatial relative descriptions used herein are correspondingly explained.

The above is only the embodiments of the present disclosure, not intended to limit the present disclosure. As will occur to those skilled in the art, the present disclosure is susceptible to various modifications and changes. Any modification, equivalent replacement, improvement and the like made within a spirit and a principle of the present disclosure should be included in a protection scope of the present disclosure.

What is claimed is:

1. A blade mounting structure, comprising a blade shaft, a motor shaft and a shaft sleeve assembly, wherein the shaft sleeve assembly is configured to connect the blade shaft and the motor shaft, and the shaft sleeve assembly comprising:
   a blade shaft sleeve, a first end of the blade shaft sleeve being configured to be connected with the blade shaft; and
   a motor shaft sleeve, a first end of the motor shaft sleeve being configured to be connected with the motor shaft, and a second end of the motor shaft sleeve being connected with a second end of the blade shaft sleeve,
   wherein at least one of the blade shaft sleeve and the motor shaft sleeve is an injection molded member.

2. The blade mounting structure as claimed in claim 1, wherein the blade shaft sleeve comprises:
   a first mounting hole, the blade shaft being detachably disposed in the first mounting hole in a penetration manner.

3. The blade mounting structure as claimed in claim 2, wherein the first mounting hole is a tapered hole or a cylindrical hole.

4. The blade mounting structure as claimed in claim 2, wherein a first predetermined space a is formed between an end surface of the blade shaft and a bottom wall of the first mounting hole, a>0.

5. The blade mounting structure as claimed in claim 2, wherein the blade mounting structure comprises a first cooperative platform surface disposed on the blade shaft, a second cooperative platform surface is disposed on an inner wall of the first mounting hole, and the first cooperative platform surface towards the second cooperative platform surface; wherein a second predetermined space b is formed between a bottom end of the first cooperative platform surface and a bottom end of the second cooperative platform surface, b>0.

6. The blade mounting structure as claimed in claim 1, wherein the blade mounting structure further comprises:
   a first fastener, the first fastener being disposed on the blade shaft sleeve and the blade shaft in a penetration manner;
   wherein an extension direction of the first fastener is consistent with an extension direction of an axis of the blade shaft.

7. The blade mounting structure as claimed in claim 6, wherein an axis of the first fastener is coincided with an axis of the blade shaft.

8. The blade mounting structure as claimed in claim 6, wherein a third predetermined space c is formed between an end portion of the first fastener and an end portion of a motor shaft sleeve, c>0.

9. The blade mounting structure as claimed in claim 1, wherein the blade shaft sleeve is in threaded connection with the blade shaft.

10. The blade mounting structure as claimed in claim 9, wherein at least a part of the blade shaft is a threaded segment, and the blade shaft sleeve comprises:
a blade shaft sleeve body; and
a first threaded portion, the first threaded portion being disposed in the blade shaft sleeve body, and the blade shaft being in threaded connection with the first threaded portion.

11. The blade mounting structure as claimed in claim 10, wherein the blade shaft sleeve body is molded on an outer surface of the first threaded portion by an injection process.

12. The blade mounting structure as claimed in claim 1, wherein the motor shaft sleeve is in threaded connection with the motor shaft.

13. The blade mounting structure as claimed in claim 12, wherein a screw thread is disposed on the motor shaft, and the motor shaft sleeve comprises:
a motor shaft sleeve body; and
a second threaded portion, the second threaded portion being disposed in the motor shaft sleeve body, and the motor shaft being in threaded connection with the second threaded portion.

14. An air conditioner, comprising the blade mounting structure as claimed in claim 6, a blade and a motor, wherein the blade is connected with the motor by the blade mounting structure.

15. The air conditioner as claimed in claim 14, wherein the air conditioner further comprises:
a rubber bearing ring, the rubber bearing ring being disposed between the blade and the motor, at least a part of the blade shaft sleeve being disposed in the rubber bearing ring in a penetration manner, and the blade shaft sleeve being in clearance fit with the rubber bearing ring.

16. The blade mounting structure as claimed in claim 1, wherein at least a part of the blade shaft sleeve comprises a tapered segment.

17. The blade mounting structure as claimed in claim 1, wherein the blade shaft sleeve comprises:
a first shaft segment, the first shaft segment being configured to be connected with the blade shaft; and
a second shaft segment, the second shaft segment being configured to be connected with the motor shaft sleeve,
wherein the first shaft segment and the second shaft segment are in conic transition.

18. The blade mounting structure as claimed in claim 17, wherein an outer diameter value of the first shaft segment is smaller than an outer diameter value of the second shaft segment.

19. The blade mounting structure as claimed in claim 17, wherein the blade shaft sleeve comprises a plurality of internal spiral latches disposed in the second shaft segment, and a mounting groove is formed between two adjacent internal spiral latches in the plurality of internal spiral latches; and the motor shaft sleeve comprises a plurality of external spiral clamping jaws, and each of the plurality of external spiral clamping jaw is respectively clamped in a corresponding mounting groove.

* * * * *